United States Patent
Meggs et al.

[15] 3,667,361
[45] June 6, 1972

[54] FILM DEVELOPING CAMERA
[72] Inventors: Daniel H. Meggs, Redondo Beach; John W. Ryan, Los Angeles, both of Calif.
[73] Assignee: Mattel, Inc., Hawthorne, Calif.
[22] Filed: Jan. 8, 1969
[21] Appl. No.: 789,804

[52] U.S. Cl. ...................................95/13, 95/89 R, 95/90.5
[51] Int. Cl. ..........................................G03b 17/50
[58] Field of Search...................................95/13, 89 R, 90.5

[56] References Cited

UNITED STATES PATENTS

| | | | |
|---|---|---|---|
| 2,966,103 | 12/1960 | Erikson | 95/13 |
| 3,264,962 | 8/1966 | Dieffenbach | 95/13 |
| 3,383,998 | 5/1968 | Takats | 95/90.5 |
| 3,426,666 | 2/1969 | Nakata | 95/31 X |

Primary Examiner—Samuel S. Matthews
Assistant Examiner—Richard L. Moses
Attorney—Seymour A. Scholnick

[57] ABSTRACT

A simple camera and film cartridge which enables the film to be developed within the camera, comprising a length of film within the cartridge with its ends joined to form a loop. The film loop can be advanced in one direction to take successive pictures and then can be moved in the reverse direction for developing. At the beginning of reverse movement, the film removes a cover that separates it from a sponge that is saturated with a monobath developer/fixer solution, so that continuous turning of the loop develops the film which can then be removed from the cartridge.

12 Claims, 4 Drawing Figures

PATENTED JUN 6 1972

3,667,361

INVENTORS
DANIEL H. MEGGS
JOHN W. RYAN

By Max E. Shirk
ATTORNEY

FILM DEVELOPING CAMERA

BACKGROUND OF THE INVENTION

1. Field of the Invention

This invention relates to cameras and film developing apparatus.

2. Description of the Prior Art

Many systems have been proposed for developing film in a camera. However, these systems have generally involved moderately complex and expensive camera and film apparatus. If a simple and economical photographic system were available which could develop the film in the camera, such a system would be useful to children and some amateur photographers who wish to spend a bare minimum on film and cameras. Such a system would not necessarily have to provide a finished print, since some positive film (e.g. slide film) can be viewed in a viewer, and prints can be easily made from negative film in child photography sets or by simple amateur equipment.

OBJECTS AND SUMMARY OF THE INVENTION

An object of the present invention is to provide a camera and film cartridge system of minimum complexity and cost, which enables film developing without the necessity for a darkroom or separate processing apparatus.

Another object is to provide a simple and economical film cartridge which enables exposure and developing to take place within the cartridge.

In accordance with the present invention, a simple and economical camera and film system is provided which enables immediate film developing within the camera after exposure, without the necessity for a dark room or for the handling of chemicals. The apparatus comprises a camera-held film cartridge including a length of film which can be moved in steps past an opening for exposure, and can then be moved in the reverse direction for developing. When the film is moved in the reverse direction, it automatically uncovers a reservoir containing a developing and fixing solution that develops the film to ready it for immediate viewing.

In one embodiment of the invention, the film is a strip with its ends joined to form a loop, and the film loop is held between rollers in a film cartridge. A reservoir with a monobath (combined developer/fixer) is included in the cartridge, with a sponge for applying the monobath to the film as it moves thereby. However, a piece of tape separates the film from the sponge during film exposure, when it advances in a forward direction. After exposing the entire loop of film, it is turned in a reverse direction by a knob on the outside of the camera. After a small movement, a slot in the film engages a tab on the tape separator, to peel off the tape and expose the film to the sponge. Continuous rotation of the film loop brings all of the film into contact with the sponge for developing. The cartridge is then opened, and the ends of the film loop are separated to provide a developed film strip for viewing or print making.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
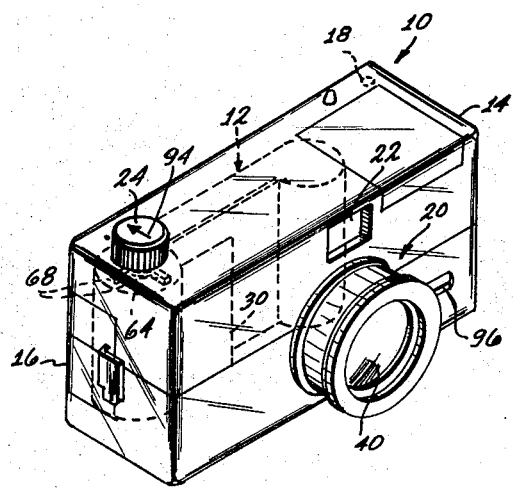
FIG. 1 is a perspective view of a camera and cartridge constructed in accordance with the invention.

FIG. 1 shows a simple camera 10 and film cartridge 12 which enable developing of the film within the camera, without the necessity for a dark room or accessory equipment and chemicals. The camera includes a light tight housing 14 with an access door 16 hinged at 18 to permit reception and removal of the film cartridge. A lens and shutter assembly 20 enables the exposure of frames of film, and a view finder 22 facilitates aiming the camera. A winding knob 24 on the camera housing is engaged with a roller within the film cartridge to permit movement of the film.

Figure 3:
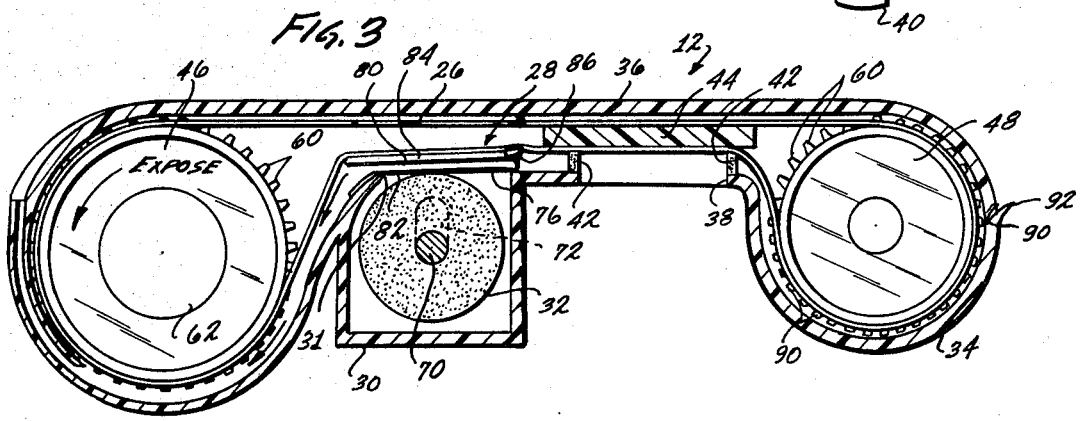
FIG. 3 is a sectional side view of the cartridge of FIG. 1.

The cartridge 12 includes a loop of film shown at 26 in FIG. 3, which permits several pictures to be taken, such as eight, the film being advanced after each exposure by turning the knob 24 by a predetermined rotation. After all pictures are taken, the knob 24 is rotated in the reverse direction by several turns to move the film in a reverse direction. Reverse knob rotation causes the automatic removal of a cover 28 from a developing reservoir 30, to permit a sponge 32 therein to contact the film 26. The developing reservoir contains a monobath which includes a combined film developer and fixer. Further rotation of the film in a reverse direction allows all portions thereof to be wiped by the sponge 32, so the entire film loop is developed. After developing, the access door 16 on the camera is opened for removal of the cartridge, a cartridge housing portion 34 is broken open, and the developed film is pulled out of the camera.

If the cartridge 12 is initially loaded with a common negative film, the developed film may be used to make prints in a conventional manner. If the cartridge has been loaded with a positive film, such as a type used to make slides, plus a suitable monobath, the developed film can be immediately viewed. Even in the case of negative film, the photographer can determine whether the pictures are in a reasonably good state. Thus, he knows whether he must take another set of photographs while he is at the scene, instead of being uncertain as to whether any pictures are good. Both the camera and cartridge are of simple and economical design, to permit use by children or by adult photographers who wish to spend only a minimum of time and money.

Figure 2:
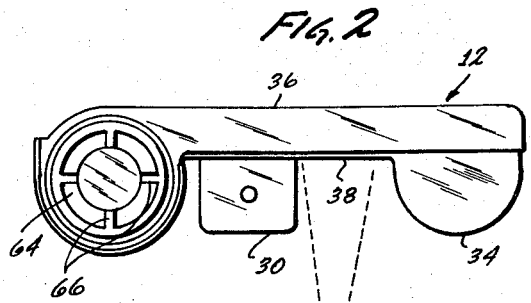
FIG. 2 is a side elevation view of the cartridge of FIG. 1.

As shown in FIG. 3, the cartridge includes a housing 36 which is light tight except for a window 38 formed therein. As shown in FIG. 2, the cartridge is adapted for insertion in a special camera so that the image formed by the camera lens 40 falls on the film portion which is behind the window 38. Light stopping means in the form of a felt border strip 42 extends around the cartridge window to prevent light from shining on any portion of the film other than the part originally in front of the window at any time prior to loading the cartridge in the camera. A back-up plate 44 is disposed behind the window to bias the film against the border strip 42, to maintain the film at a particular plane and to prevent light from reaching the other side of the film loop.

The cartridge has a pair of rollers 46 and 48 rotatably mounted on the cartridge housing, for holding the film in a loop. The film is in the form of a strip with ends 50 and 52 joined in a lap joint at 54, to form a loop. The edges of the film are provided with sprocket holes 56, which are engaged with sprockets 60 on the rollers 46, 48 to assure positive film engagement with the rollers. One of the rollers 46 is mounted on a shaft 62 which extends through the cartridge. A knob-engaging wheel 64 with indentations 66 therein is fixed to the shaft 62 on the end thereof outside the cartridge. This wheel is designed to engage projections 68 on the inner end of the winding knob 24 that is mounted on the camera housing. The projections 68 are mounted on the knob to permit slight in and out movement, but are biased inwardly to positively engage the wheel 64.

The developing reservoir 30 is formed in a portion of the cartridge housing. The sponge 22 is in the form of a cylinder, and is rotatably mounted on a shaft 70. The shaft 70 is retained in slots 72 at either end of the reservoir, to permit it to move toward and away from the film path. The sponge may be retained initially in a slightly compressed state so it tends to move toward the film path, or a spring may be included to bias the shaft toward the film path. The reservoir 30 contains a monobath solution which is normally retained in the sponge.

The monobath solution serves as both a developer and fixer, so that wiping it on exposed film is sufficient to develop the film and ready it for use.

Figure 4:
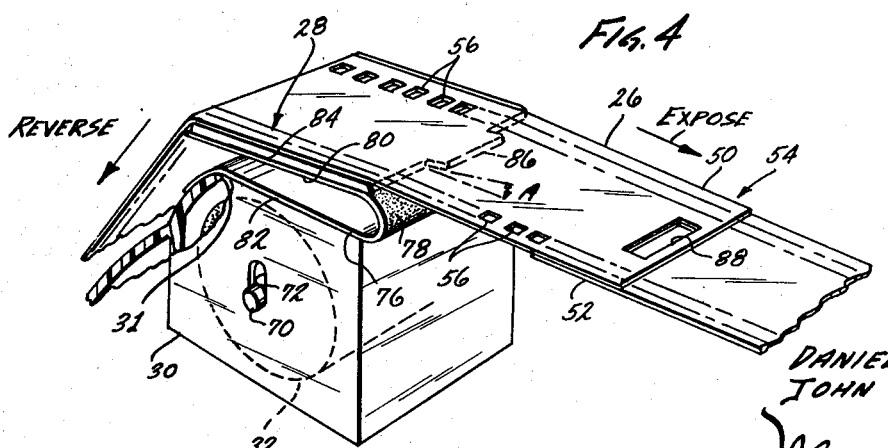
FIG. 4 is a partial perspective view of the apparatus of FIG. 1.

Prior to exposing the film, it must be separated from the monobath-saturated sponge 32. This is accomplished by the cover 28. The cover 28, which is shown in greater detail in FIG. 4, includes as sheet 76 with an adhesive 78 on one side, a piece of adhesive tape generally being adequate for this purpose. The sheet is mounted in a folded-over position, with the adhesive side facing outwardly, to form an upper portion 80 and a lower portion 82. The sheet is shown with a large radius at the fold for clearity, but in practice the fold is almost a crease. The lower portion 82 of the sheet covers the reservoir and sponge therein, to seal it against evaporation, spillage or other loss of monobath solution, and to also prevent contact between the sponge and film prior to desired developing.

A tab 84 of stiff material is fastened to the upper portion 80 of the cover sheet. The tab has an upwardly extending lug 86, which can engage a slot 88 formed in the film at the joint 54 thereof. The slot 88 extends through both ends 50 and 52 of the film at the joint. When the film is moved in a forward direction, as indicated by the arrow labeled "Expose," the film slot 88 passes by the lug 86 without positively engaging it. However, when the film moves in a reverse direction, the lug 86 rides into the slot 88 and firmly engages the film. The slot is formed at an angle A with a line perpendicular to the film to encourage such engagement.

Continuous movement of the film in the reverse direction causes the tab 84 to move with the film, by reason of firm engagement of the lug 86 in the film slot. The tab drags the cover sheet 76 along with it, so that the bottom portion 76 is peeled away from the opening 31 in the reservoir. This allows the monobath-saturated sponge 32 to move up against the film. It may be noted that the force exerted by the walls of the film slot 88 on the lug do not tend to separate the ends of the film lap joint 54 since the slot extends through both ends of the film. As the film continues to move in the reverse direction, all portions thereof are covered with the monobath solution, which develops the film. After a period of time sufficient to develop the film, the film may be removed from the camera.

Removal of the developed film is accomplished by breaking open the housing portion 34 of the film cartridge. The housing portion 34 comprises a plate which is held in place by a thin light-tight web 90 that encircles it. A projection 92 on the plate can be lifted by the photographer to facilitate breaking away the housing portion. With the housing portion 34 removed, the overlapped ends 50, 52 of the film strip can be separated, and the film pulled out of the camera.

In order to use the camera, the access door 16 is opened, a film cartridge is inserted, and the door is closed. Initially the lap joint 52 of the film loop is located in the cartridge window 38. The photographer first turns the winding knob 34 in the forward direction represented by the arrow labeled "Expose," by one-half turn. A marker 94 on the knob facilitates the proper amount of turning. The initial half-turn brings an unexposed portion of the film strip into the cartridge window. A shutter operating lever 96 on the camera can be depressed to take a picture. After each picture, the winding knob 24 is advanced by another half-turn, until all eight pictures have been taken. An additional turn moves the film loop so that the lap joint 54 is past the tab 84 on the reservoir (e.g. at a position in the window 38).

The winding knob can then be turned in the reverse direction to develop the film. DUring the first half-turn in the reverse direction, the lug 86 on the tab engages the slot 88 in the film at the lap joint and begins to move the tab 84 in the reverse direction. This causes the bottom portion 82 of the sheet to be peeled away from the reservoir opening 31. Additional reverse knob turning for a total of nine turns brings all portions of the film in contact with the sponge. After developing is finished, the access door 16 on the camera is opened and the film cartridge is removed therefrom. The housing portion 34 on the cartridge can then be broken open by lifting the projection 92. The roller 46, is then turned to bring the loop joint 54 adjacent to the opening provided by removal of the housing portion 34. The photographer then separates the overlapped ends 50, 52 of the film and pulls the film strip out of the camera.

The film cartridge is designed for only a single use, and can be discarded after the film is removed therefrom. Most of the film 26 is utilized to take pictures, although the portions at the lap joints are not used. In order to simplify operation and construction, the film could be removed through the window 38 in the cartridge housing. However, the window would have to be made large enough to permit film removal, or a break-away housing portion would have to be provided around it. Another modification would be to provide a reservoir cover tab which can engage the film slot or other engaging means on the film while the film moves in a forward or Expose direction, instead of in the reverse direction. In this case, after the total of eight exposures were made, the knob would be turned about ten turns in the forward direction to peel away the reservoir cover and allow all of the exposed film to be developed. Of course, many aids could be employed, such as a counter to keep track of the number of exposures made. Even with a few of such aids, he camera and cartridge is of very simple design and can be manufactured and sold at a very low price.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. Photography apparatus comprising:
    a light-tight film cartridge housing;
    an elongated strip of film mounted in said cartridge housing;
    means defining a window in said cartridge housing for emitting light to expose said film;
    reservoir means containing a developing solution mounted on said cartridge housing for developing said film;
    cover means overlaying said reservoir means for selectively separating said developing solution from said film when said film passes said reservoir;
    means for moving said film past said window and past said reservoir means; and
    means a part of said film for engaging and for removing said cover means during a portion of the movement of said film past said reservoir means, to bring said film in contact with said developing solution after exposure of the film.

2. Photography apparatus comprising:
    a light-tight film cartridge housing;
    an elongated strip of film mounted in said cartridge housing;
    means defining a window in said cartridge housing for admitting light to expose said film;
    reservoir means containing a developing solution mounted on said cartridge housing for developing said film;
    cover means for sealing said reservoir means from contact with said film;
    means for moving said film strip past said window and past said reservoir means, said moving means comprising a roller engaged with said film strip, a shaft rotatably supporting said roller on said cartridge housing, and turning means mounted on the outside of said cartridge housing and rotatably coupled to said shaft;
    means for removing said cover means during a portion of the movement of said strip past said reservoir means, to bring said film strip in contact with said developing solution during movement after exposure of the film; and
    a camera including a camera housing for receiving said film cartridge and knob means rotatably mounted on said camera housing, said knob means having a portion extending within said camera housing for engaging said turning means on said cartridge housing.

3. Photography apparatus comprising:
    a light-tight film cartridge housing;
    an elongated strip of film mounted in said cartridge housing;

means defining a window in said cartridge housing for admitting light to expose said film;

reservoir means containing a developing solution mounted on said cartridge housing for developing said film;

cover means for sealing said reservoir means from contact with said film, said cover means comprising a sheet having a side with adhesive thereon disposed over said reservoir;

means for moving said film strip past said window and past said reservoir means; and means for removing said cover means curing a portion of the movement of said strip past said reservoir means to bring said film strip in contact with said developing solution during movement after exposure of the film, said removing means comprising means on said film strip for engaging said sheet to peel it off said reservoir means.

4. Photography apparatus comprising:

a light-tight film cartridge housing;

an elongated strip of film mounted in said cartridge housing;

means defining a window in said cartridge housing for admitting light to expose said film;

reservoir means containing a developing solution mounted on said cartridge housing for developing said film;

cover means for sealing said reservoir means from contact with said film, said film strip having ends joined to form a loop;

means for moving said film strip past said window and past said reservoir means, said moving means comprising a pair of rollers for engaging said loop and means for rotating at least one of said rollers from outside said housing; and means for removing said cover means during a portion of the movement of said film strip past said reservoir means to bring said film strip in contact with said developing solution during movement after exposure of the film.

5. Photography apparatus comprising:

a light-tight film cartridge housing;

an elongated strip of film mounted in said cartridge housing, said film strip being formed as a loop with a slot therein;

means defining a window in said cartridge housing for admitting light to expose said film;

reservoir means containing a developing solution mounted on said cartridge housing for developing said film;

cover means for sealing said reservoir means from contact with said film, said reservoir cover means comprising a piece of adhesive tape disposed over said reservoir means and a tab fixed to said tape for engaging the walls of said film slot to peel said tape away from said reservoir means as said film moves in a predetermined direction.

6. Photography apparatus comprising:

a light-tight film cartridge housing;

an elongated strip of film mounted in said cartridge housing, said film strip having ends to form a loop;

means defining a window in said cartridge housing for admitting light to expose said film;

reservoir means containing a developing solution mounted on said cartridge housing for developing said film;

means formed in said cartridge housing to permit access to said ends of said film strip to enable separation of the film strip ends to pull out said film strip from said housing;

cover means for sealing said reservoir means from contact with said film;

means for moving said film strip past said window and past said reservoir means; and means for removing said cover means during a portion of the movement of said film strip past said reservoir means, to bring said film strip in contact with said developing solution during movement after exposure of the film.

7. A film cartridge which enables pictures to be taken and developed within a camera comprising:

a light-tight film cartridge housing;

a strip of film formed in a loop and disposed in said housing;

window means formed in said housing for permitting the exposure of said film;

means for guiding said film loop in movement along a path past said window means;

reservoir means positioned along said path, said reservoir means containing chemicals for developing said film;

cover means disposed between said reservoir means and said film path; and means for removing said cover means from said reservoir means to enable the application of said chemicals to said film.

8. The film cartridge described in claim 7 wherein:

said strip has overlapping ends joined to form said loop, and including a slot formed through said ends; and said means for removing said cover means comprises a tab attached to said cover means for engaging said slot in said film strip.

9. The film cartridge described in claim 7 wherein:

said cover means comprises tape with adhesive for sealing said reservoir means, and means mounted on said tape for engaging said film strip to peel off said tape.

10. Apparatus for taking pictures on film and developing the film comprising:

a camera housing including a lens for forming an image, a shutter, and winding knob means, said winding knob means including a rotatable element within said camera; and a film cartridge for reception in said camera housing, said cartridge including a loop of film, window means for receiving an image formed by said camera lens, roller means for moving said film loop in a first direction and a second direction reversed from said first direction along a path past said window means, said roller means including means for engaging said rotatable element to enable roller rotation by operation of said winding means, film developer means disposed along said film path intermediate the roller means and spaced therefrom and including chemicals for developing said film cover means for separating said film from said chemicals when said film is moved in said first direction and means for removing said cover means when said film is moved in said second direction.

11. Apparatus for taking pictures on film and developing film comprising:

a camera housing including a lens for forming an image, a shutter, and winding knob means, said winding knob means including a rotatable element within said camera; and a film cartridge for reception in said camera housing, said cartridge including a strip of film formed in a continuous loop, window means for receiving image formed by said camera lens, roller means for moving said film strip along a path past said window means, said roller means including means for engaging said rotatable element to enable roller rotation by operation of said winding means, developer means disposed along said film path and including chemicals for developing said film cover means for sealing said film from said chemicals in said developer means and means for removing said cover means.

12. Apparatus for taking pictures on film and developing the film comprising:

a camera housing including a lens for forming an image, a shutter, and winding knob means, said winding knob means including a rotatable element within said camera; and a film cartridge for reception in said camera housing, said cartridge including a strip of film, window means for receiving an image formed by said camera lens, roller means for moving said film strip along a path past said window means, said roller means including means for engaging said rotatable element to enable roller rotation by operation of said winding means, film developer means disposed along said film path and including chemicals for developing said film cover means for sealing film from said chemicals in said developer means and means for removing said cover means, said removing means comprising means for engaging said film strip to remove said cover means during only film strip movement in a predetermined direction.

* * * * *